United States Patent
Chirca

(10) Patent No.: US 9,727,549 B2
(45) Date of Patent: Aug. 8, 2017

(54) ADAPTIVE KEY-BASED NAVIGATION ON A FORM

(71) Applicant: Microsoft Technology Licensing, LLC, Redmond, WA (US)

(72) Inventor: Daniel Chirca, Copenhagen (DK)

(73) Assignee: Microsoft Technology Licensing, LLC, Redmond, WA (US)

(*) Notice: Subject to any disclaimer, the term of this patent is extended or adjusted under 35 U.S.C. 154(b) by 73 days.

(21) Appl. No.: 14/198,827

(22) Filed: Mar. 6, 2014

(65) Prior Publication Data

US 2015/0254225 A1    Sep. 10, 2015

(51) Int. Cl.
*G06F 3/00* (2006.01)
*G06F 17/24* (2006.01)
*G06F 3/0489* (2013.01)
*G06F 3/0481* (2013.01)
*G06F 3/0483* (2013.01)

(52) U.S. Cl.
CPC .......... *G06F 17/243* (2013.01); *G06F 3/0481* (2013.01); *G06F 3/0483* (2013.01); *G06F 3/04892* (2013.01); *G06F 3/04895* (2013.01)

(58) Field of Classification Search
CPC ...... G06F 17/243; G06F 17/2235; G06F 3/00; G06F 3/04892; G06F 3/04895; G06F 3/0481; G06F 3/0483
See application file for complete search history.

(56) References Cited

U.S. PATENT DOCUMENTS

| | | |
|---|---|---|
| 6,252,592 B1 | 6/2001 | King et al. |
| 7,278,113 B1 | 10/2007 | Racine et al. |
| 7,849,397 B1 | 12/2010 | Ahmed |
| 7,913,184 B1 | 3/2011 | Zhang et al. |
| 8,166,414 B2 | 4/2012 | Cragun et al. |
| 8,245,147 B2 | 8/2012 | Copland et al. |
| 8,539,378 B2 | 9/2013 | El-Nakhily et al. |
| 8,572,480 B1 | 10/2013 | Goodwin et al. |
| 2005/0015730 A1 | 1/2005 | Gunturi et al. |
| 2006/0229889 A1* | 10/2006 | Hodjat ................. G06F 9/4443 709/202 |
| 2008/0120257 A1 | 5/2008 | Goyal et al. |
| 2010/0037158 A1 | 2/2010 | Commarford et al. |
| 2010/0262908 A1* | 10/2010 | Gallo ............... G06F 17/30867 715/704 |
| 2013/0117105 A1* | 5/2013 | Dyor .................. G06Q 30/0251 705/14.52 |

(Continued)

OTHER PUBLICATIONS

Mott, Elizabeth, "How to Set Auto Tab Order in Microsoft FrontPage", Published on: May 24, 2013, Available at: http://smallbusiness.chron.com/set-auto-tab-order-microsoft-front-page-49945.html.

(Continued)

*Primary Examiner* — Kyle Stork
(74) *Attorney, Agent, or Firm* — Christopher J. Volkmann; Kelly, Holt & Christenson, PLLC

(57) ABSTRACT

A navigation learning system learns the field sequence that a given user uses to enter data into a given form. When the user completes entering data in a first field and performs a key-based navigation action (such as by actuating the tab key), a form navigation component identifies the next most likely field, into which the user will be entering data, and navigates the cursor to the identified field.

16 Claims, 16 Drawing Sheets

(56) References Cited

U.S. PATENT DOCUMENTS

2016/0189030 A1\* 6/2016 Jain .................. G06N 5/022
                                                    706/46

OTHER PUBLICATIONS

Charles, Tommy, "How to Change the Field Order in Adobe Acrobat 9", Published on: Aug. 2, 2011, Available at: http://www.ehow.com/how__8510886__change-order-adobe-acrobat-9.html.
"How to set the "tab order" of a Word form", Published on: Feb. 27, 2004, Available at: http://word.mvps.org/faqs/tblsfldsfms/SetTabOrder.htm.
"International Preliminary Report on Patentability Issued in PCT Patent Application No. PCT/US2015/017870", Mailed Date: Apr. 7, 2016, 8 Pages.
International Search Report and Written Opinion for International Application No. PCT/US2015/017870, date of mailing: Jun. 17, 2015, date of filing: Feb. 27, 2015, 13 pages.
Second Written Opinion for International Patent Application No. PCT/US2015/017870, date of mailing: Jan. 18, 2016, date of filing: Feb. 27, 2015, 7 pages.

\* cited by examiner

FORM

- 254 LAST NAME
- 256 FIRST NAME
- 258 EMAIL
- 260 ACCOUNT NO.
- 262 COMPANY ADDRESS
- 264 PHONE NO.
- 266 INVOICE NO.
- 268 DESCRIPTION
- 270 INVENTORY ITEM
- 272 NOTES
- 274 SUBMIT
- 276 CLEAR
- 278 AUTOMATIC TAB NAVIGATION/LEARNING
- 280 ON
- 282 OFF
- 252

FIG. 1B

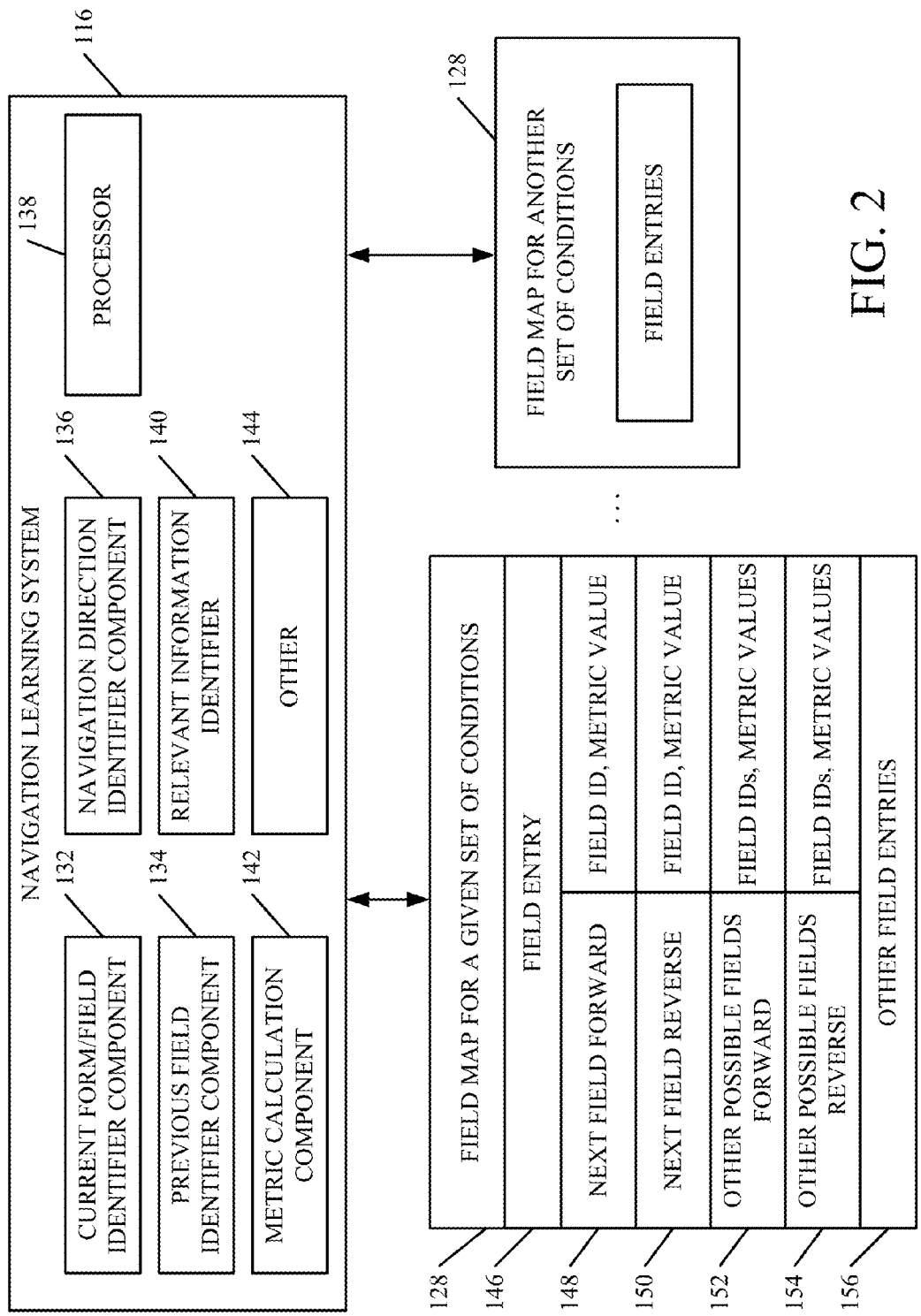

ADAPTIVE KEY-BASED NAVIGATION ON A FORM

BACKGROUND

Computer systems are currently in wide use. Many computer systems present forms for user interaction.

By way of example, some such computer systems include business systems. Business systems can be enterprise resource planning (ERP) systems, customer relations management (CRM) systems, line-of-business (LOB) systems, among others. These types of business systems often include hundreds or even thousands of forms that are presented to various users in different roles. Each form may have many different fields, into which the users enter data.

Users often perform data entry in these types of forms, using the keyboard (hardware or virtual or a keypad) as their basic means of inputting data. Such users also often use key-based navigation to navigate among the various fields on the forms. For instance, in some applications, when a form is displayed, the user can navigate forward through the fields by using the tab key. The user can navigate backward through the fields by using shift-tab. The order of navigation is hard-coded. That is, when the cursor is in one field, and the user actuates the tab key, the cursor automatically navigates to a next field and the order of the fields that the cursor navigates to (the field sequence), with each actuation of the tab key, is hard-coded. Thus, every time the user actuates the tab key, the navigation takes the user to the next default field.

However, different users may have different roles within a computing system. Yet, those different users may be presented with the same form. Because the users have different roles, it may be that some fields are mandatory for one user, but they can normally be left empty for another user. Therefore, even if a given user repeatedly enters data in the same fields of a form, the user may have to repeatedly actuate the tab key to skip unused fields. In addition, the field sequence in which a user enters data may vary from user-to-user. Thus, even if two users have the same role for the same organization, they may enter data into the fields of a given form using a different field sequence.

The discussion above is merely provided for general background information and is not intended to be used as an aid in determining the scope of the claimed subject matter.

SUMMARY

A navigation learning system learns the field sequence that a given user uses to enter data into a given form. When the user completes entering data in a first field and performs a key-based navigation action (such as by actuating the tab key), a form navigation component identifies the next most likely field, into which the user will be entering data, and navigates the cursor to the identified field.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 1B shows one exemplary user interface display.

FIG. 2 is a more detailed block diagram of a navigation learning system and of a set of field maps.

DETAILED DESCRIPTION

Figure 1:
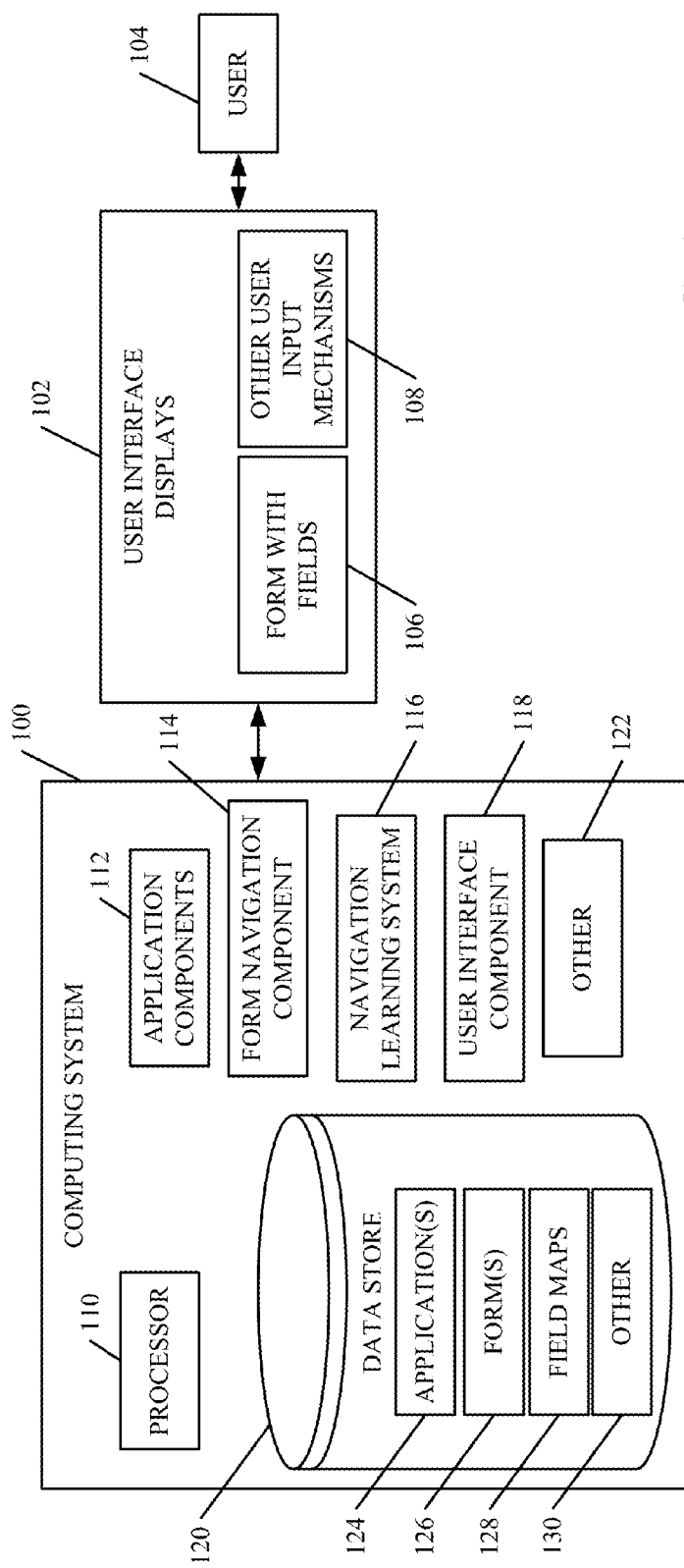
FIG. 1 is a block diagram of one illustrative computing system.

FIG. 1 is a block diagram of one illustrative computing system 100. Computing system 100 generates user interface displays 102 for interaction by user 104. In one embodiment, the user interface displays 102 include forms 106 that have a plurality of fields, for data entry by user 104. The user interface displays 102 can also include other user input mechanisms 108, as well.

FIG. 1 also shows that computing system 100 illustratively includes processor 110, application components 112, form navigation component 114, navigation learning system 116, user interface component 118, data store 120, and it can include other items 122 as well. Data store 120 illustratively includes applications 124, forms 126, field maps 128, and it can include other data 130 as well.

In one embodiment, application components 112 run applications 124. The applications 124 illustratively generate forms 126 for display to user 104. User interface component 118 either by itself, or under the control of other items in computing system 100, illustratively generates the forms 126 as user interface displays 102 so that user 104 can enter data into the fields on the forms. Navigation learning system 116 illustratively learns the sequence that user 104 navigates through the fields of each given form, in certain contexts, and generates a set of field maps 128 for the various forms 126 that are presented by applications 124.

During runtime, a user accesses a form and begins to fill it out and provides key-based navigation inputs (e.g., the user actuates the tab key) to move through the fields on the form. Form navigation component 114 illustratively accesses the field maps 128 and performs automated key-based navigation through the fields in the form, in response to the key-based navigation inputs. As one example, the user can actuate the tab key in order to navigate through the fields in a sequence set out in the corresponding field map 128 in a first direction. The user can also, in one embodiment, actuate the shift-tab keys to navigate through the fields in a reverse sequence set out in the corresponding field map 128. Learning the navigation sequence and performing automatic key-based navigation is discussed in greater detail below with respect to FIGS. 1A-4.

Figure 1A:
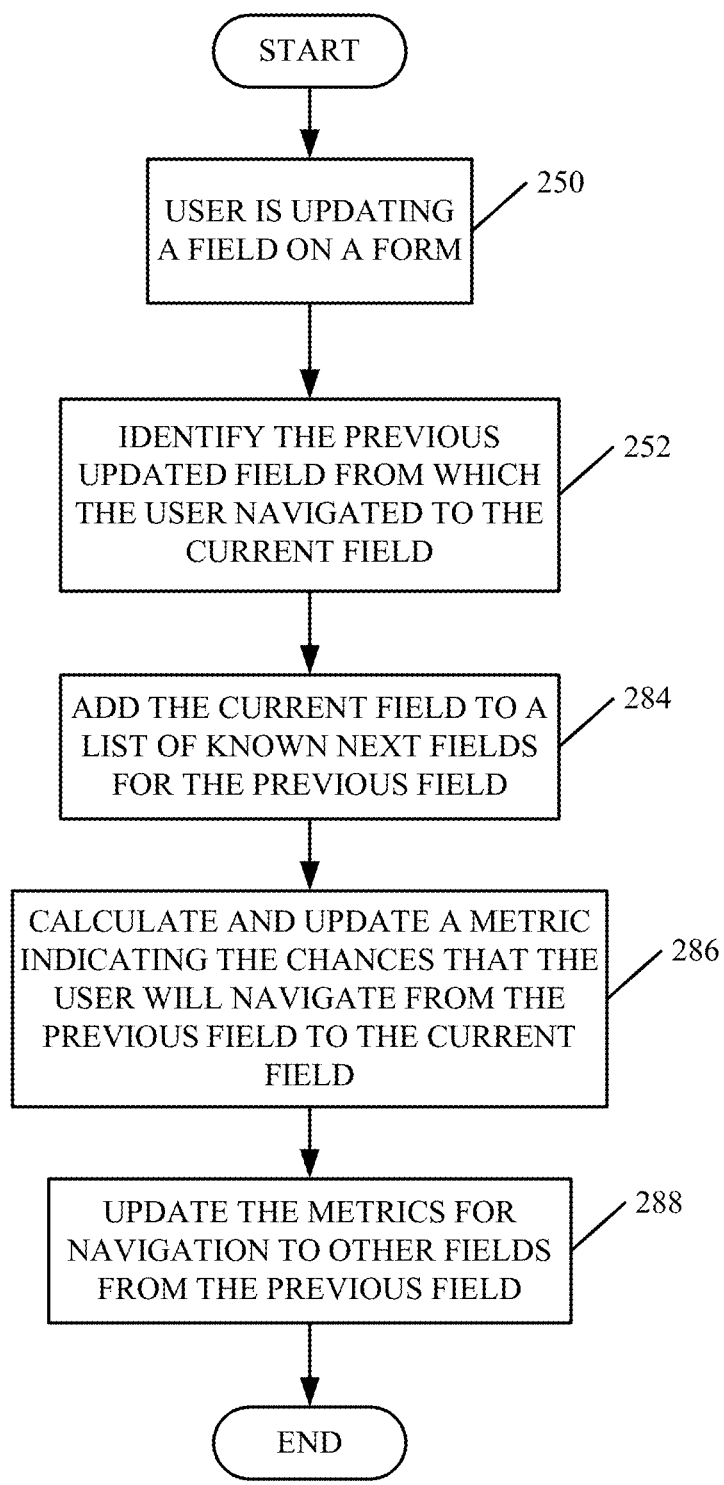
FIG. 1A is a simplified flow diagram illustrating how the system in FIG. 1 learns the field sequence for a given user and a given form.

FIG. 1A is a simplified flow diagram illustrating one embodiment of the operation of navigation learning system 116 in learning the field sequence for a given user on a given form. It is first assumed that user 104 is accessing a given form and is updating a field on that form. This is indicated by block 250 on FIG. 1A. For instance, FIG. 1B shows one example of a user interface display displaying an exemplary form 252. Form 252 includes a plurality of different fields. The fields include last name field 254, first name field 256, e-mail field 258, account number field 260, company address field 262, phone number field 264, invoice number field 266, description field 268, inventory item field 270, and notes field 272. It also illustratively includes a submit user input mechanism 274 that allows the user to submit the form to the computing system 100, and a clear user input mechanism 276 that allows the user to clear the form. It also illustratively includes an automatic tab navigation/learning user input mechanism 278 that has an on button 280 and an off button 282. The buttons allow the user to turn on and off the automatic tab navigation and learning process.

A user may only need to enter data into a subset of the fields on the form 252. However, the user may often enter data into the same subset of fields in the same order or sequence. Navigation learning system 116 learns this sequence for this form and this user so that form navigation component 114 can automatically navigate the user through the fields in the learned sequence.

To describe this, assume, for the sake of example, that the user previously updated the e-mail field 258 and then tabbed through fields 260 and 262 to the phone number field 264 and began entering a phone number in field 264. Entering information into the current field 264 on the form is indicated by block 250 in FIG. 1A. Navigation learning system 116 then identifies the most recent previous field where the user entered data (e.g., email field 258). This is indicated by block 252 in FIG. 1A. Navigation learning system 116 then adds the current field (the phone number field 264) to a list of known next fields for the previous field (the e-mail field 258). This is indicated by block 284 in FIG. 1A.

Navigation learning system 116 then calculates and updates a metric indicating the chances that the user will navigate from the previous field (e-mail field 258) to the current field (phone number field 264). Calculating and updating the metric is indicated by block 286 in FIG. 1A. System 116 then updates the same metrics for navigation to other fields on form 252, from the previous field (e-mail field 258). This is indicated by block 288 in FIG. 1A. System 116 does this for various iterations of user interactions with form 252 to learn the user's most likely navigation sequence for data entry on the fields of the form. This information can be stored in a field map 128 for this form 252.

Figure 1C:
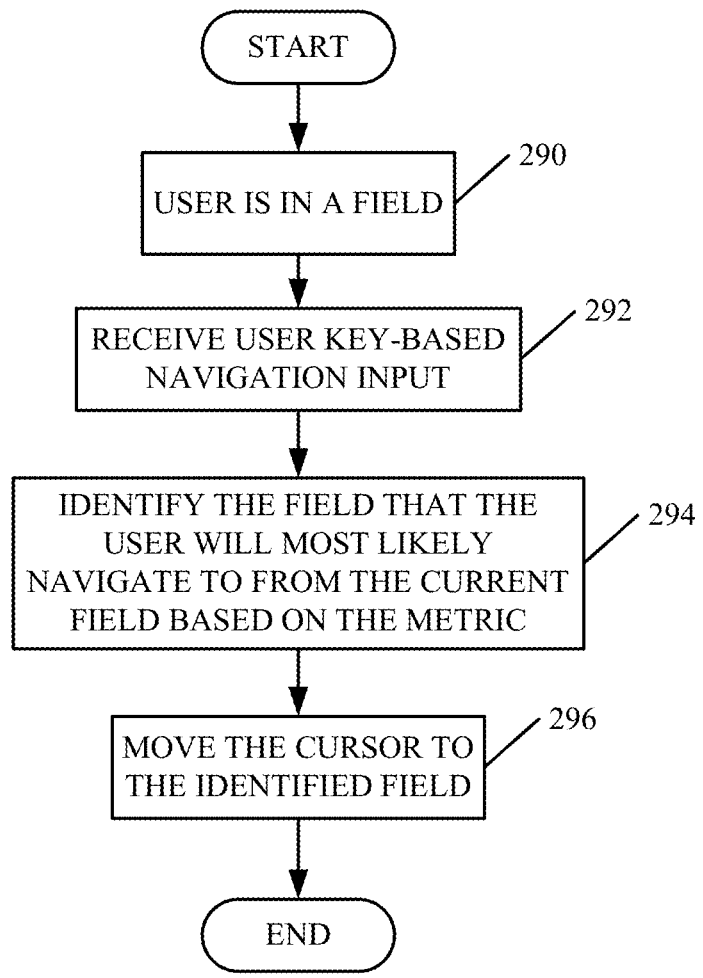
FIG. 1C is a simplified flow diagram illustrating how the system in FIG. 1 uses the learned field sequence to automatically navigate the user through fields of the given form.

FIG. 1C is a simplified flow diagram illustrating how this information can be used to perform automated tab navigation during runtime. It is first assumed that user 104 has opened form 252 and is in a field (such as e-mail field 258). This is indicated by block 290 in FIG. 1C. Then, form navigation component 114 receives a key-based navigation input from user 104. For instance, the user can actuate the tab key or the shift-tab key. This is indicated by block 292. Form navigation component 114 then identifies the field that the user will most likely navigate to from the current field, using the metrics stored in the field map 128 in data store 120. This is indicated by block 294.

In the present example, it is assumed that form navigation component 114 will identify the phone number field 264 as the most likely field that the user will navigate to, from the e-mail field 258. Thus, form navigation component 114 moves the cursor to the identified field (e.g., to the phone number field 264) in response to receiving the tab navigation input from user 104. Moving the cursor is indicated by block 296 in FIG. 1C. Thus, the user need not manually tab through the fields between fields 258 and 264. Instead, with one tab key actuation, the cursor is automatically moved from field 258 to field 264.

FIG. 2 shows a more detailed block diagram of navigation learning system 116. In the embodiment shown in FIG. 2, system 116 illustratively includes current form/field identifier component 132 that identifies a current form and field to which the user has navigated. System 116 also includes previous field identifier component 134 that identifies the previous field where the user entered data and from which the user navigated. Navigation direction identifier component 136 identifies the direction of navigation (such as forward or reverse) through the fields. System 116 also illustratively includes processor 138 and relevant information identifier 140. Identifier 140 identifies relevant information that can be used to determine the context in which the user is using a given field in a given form. System 116 also includes metric calculation component 142 that calculates a metric corresponding to fields on the present form, to indicate how likely it is that the user will navigate to a specific field from another field on the current form. System 116 can of course include other items 144 as well.

FIG. 2 also shows a more detailed embodiment of one illustrative field map 128. The field map 128 shown in FIG. 2 is a field map for a given set of conditions. It illustratively includes a field entry 146 for each of the fields on the current form. The field entry 146 includes a next field identifier 148 that identifies the next most likely field that the user will navigate to if the user performs key-based navigation in the forward direction. Field entry 146 also includes a next most likely field 150 if the user performs key-based navigation in the reverse direction. It also includes other possible fields 152, that the user may navigate to in the forward direction and other possible fields 154 that the user may navigate to in the reverse direction. It includes a field entry 146, with each of these items, for each field on the form. Therefore, field map 128 illustratively includes other field entries 156, for the other fields on the form as well.

It will be appreciated that each field map 128 maps the fields on a given form under a certain set of conditions. Some of the conditions are discussed in greater detail below. Briefly, however, the conditions may include the particular device that the user is using to access the present form, the previous form that the user navigated from to open the present form, or a variety of other conditions. Therefore, there can be multiple field maps 128 for each form, depending upon the particular conditions under which the user is accessing the form. This is described in greater detail below.

Figure 3A:
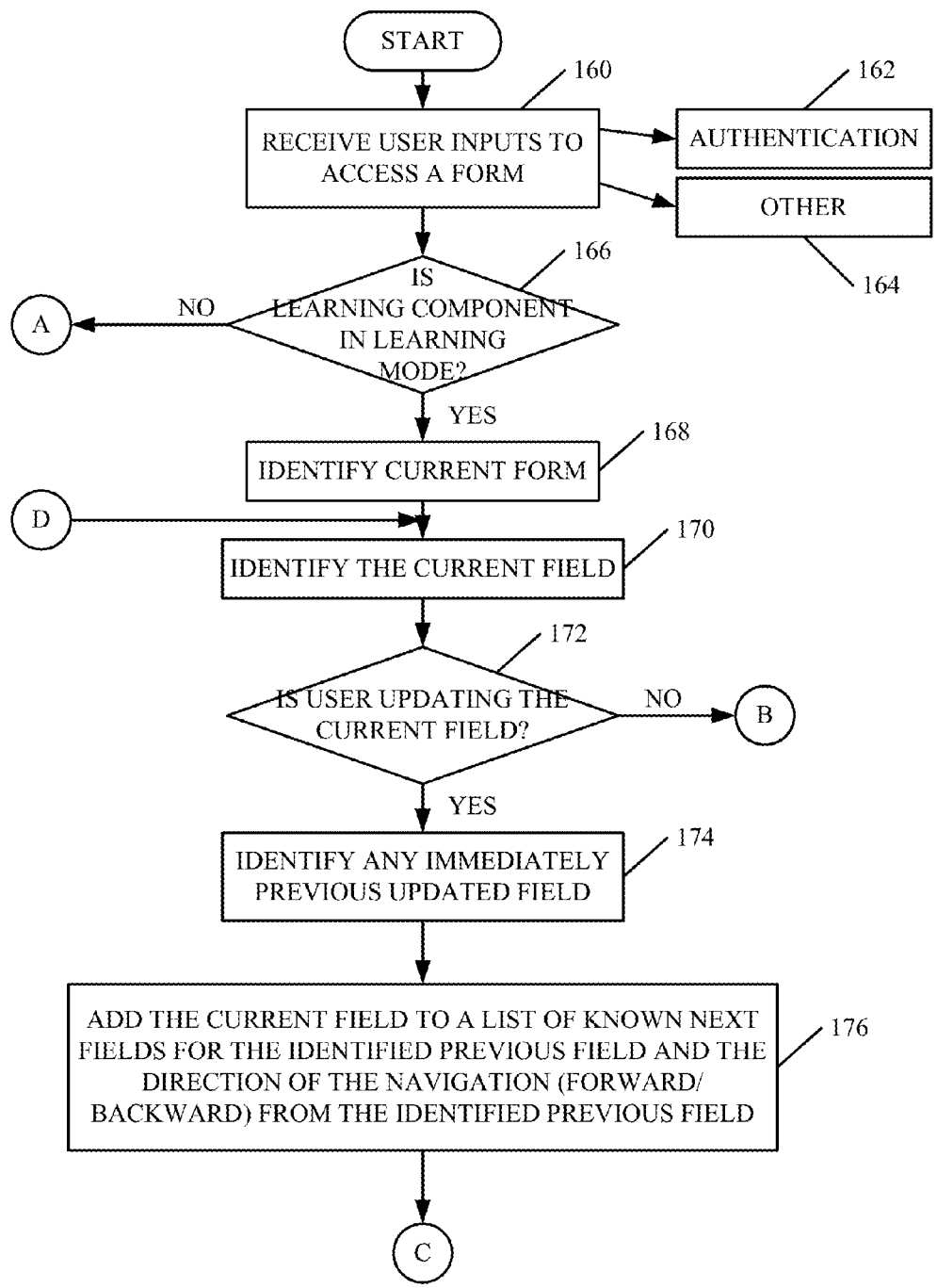
FIGS. 3A and 3B (collectively FIG. 3) show a more detailed flow diagram illustrating the operation of the computing system shown in FIG. 1 in learning a field sequence for a given user and a given form.
Figure 3B:
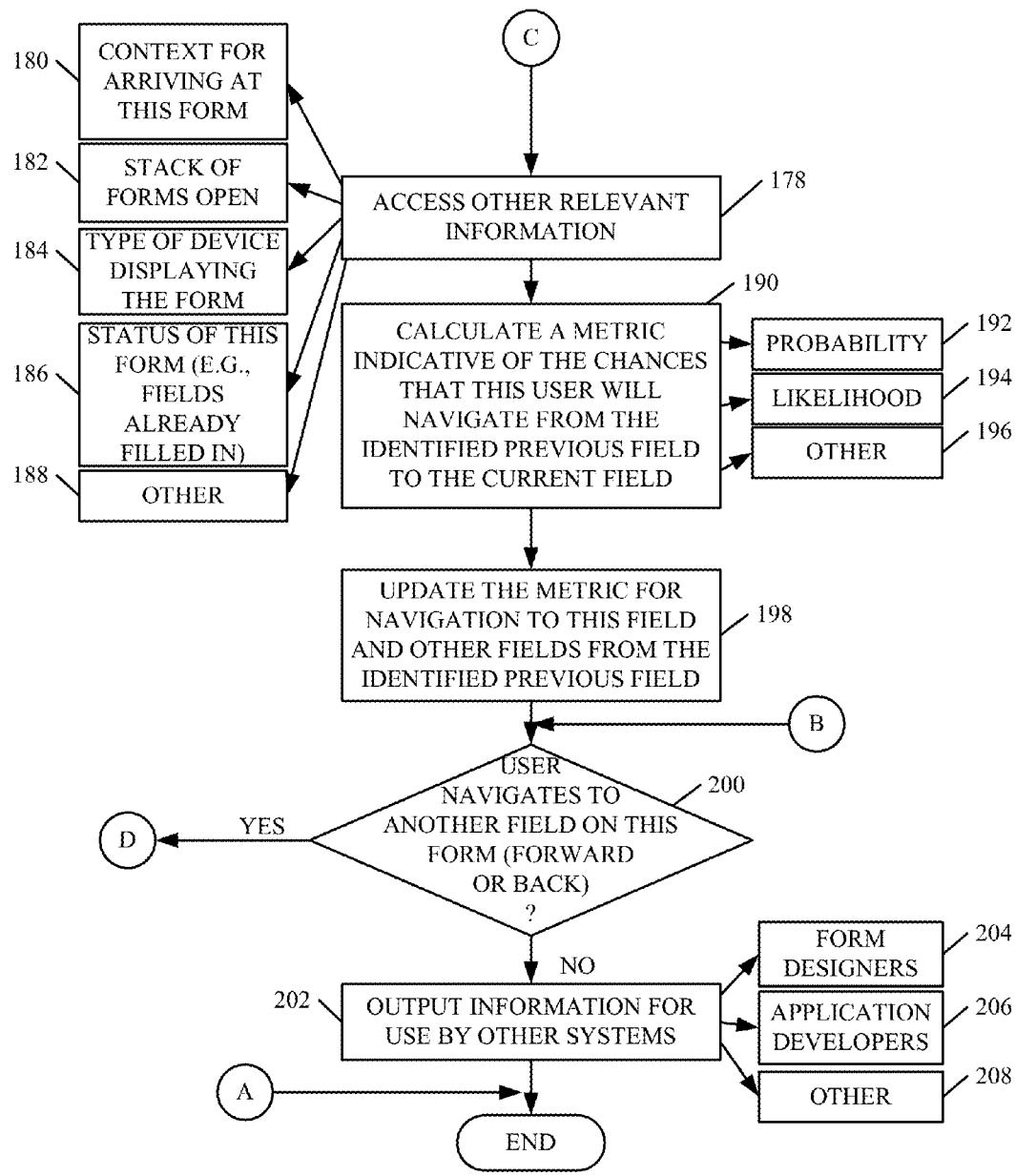

FIGS. 3A and 3B (collectively FIG. 3) show a flow diagram illustrating a more detailed embodiment of the operation of navigation learning system 116 in learning the most likely field sequence that a given user will progress through, in order to enter data in the fields of a particular form.

FIGS. 2 and 3 will now be described in conjunction with one another. It is first assumed that computing system 100 receives user inputs to access a particular form 126 in a particular application 124. This is indicated by block 160 in the flow diagram of FIG. 3. The user inputs can include authentication information 162 (such as a username and password), and other information 164 (such as user inputs to pull up the desired form).

In one embodiment, user 104 can illustratively activate or deactivate the automatic key-based navigation learning system 116. That is, if the user wishes to simply navigate through the fields of a form in the conventional way, using the default field sequence, the user can illustratively deactivate the learning system 116. This can be done, for example, using button 282 in FIG. 1B. It is assumed for the sake of the present discussion that the user has activated the navigation learning system 116. This is indicated by block 166 in the flow diagram of FIG. 3.

That being the case, once user 104 has provided inputs to access a particular form, current form/field identifier component 132 in system 116 identifies the current form that is being accessed by user 104. This is indicated by block 168. Component 132 also identifies the current field that the cursor is placed in. This is indicated by block 170.

Component 132 then determines whether the user is actually updating the current field. This is indicated by block 172. For instance, if the user is not updating the current field, but simply performs a tab navigation to navigate to another field, then component 132 determines that the current field is not a field that the user enters data into, on the particular form.

However, if, at block 172, the user is updating (or has updated) the current field, then previous field identifier component 134 in system 116 identifies any immediately previous updated field that the user has navigated from. This is indicated by block 174. For instance, if the user is currently in field 264 on form 252 in FIG. 1B, the component 134 identifies the last field that the user entered data into, prior to navigating to the current field (such as field 258). Navigation direction identifier component 136 also identifies the direction of navigation (such as forward or reverse in the field sequence) that the user used to navigate to the current field. Components 134 and 136 then add the current field (field 264) to a list of known next fields for the identified previous field (field 258) along with the direction of navigation (e.g., forward/backward) from the identified previous field (field 258). Adding the current field to the list of known next fields for the previous field is indicated by block 176 in FIG. 3.

Relevant information identifier 140 then accesses other relevant information that can be used in memorizing the field sequence for this user on this form. Accessing other relevant information is indicated by block 178. Some of the other relevant information can include the context for arriving at this form. This is indicated by block 180. For instance, if the user has just opened the particular application 124 that generates the present form, this may be relevant context information. However, if the user has navigated to the present form from a previous form within the application, or within a different application, this can be relevant context information as well. In such circumstances, it may be that the user enters data in a different sequence, or in different fields, depending on how the user arrived at the form.

Relevant information identifier 140 may also identify the stack of forms that are open on the user's computing device and the order of navigation from all of those forms to the present form. This is indicated by block 182.

The relevant information can include the type of device that the user is using to access the form. This is indicated by block 184. For instance, it may be that when a user is accessing a particular form from his or her desktop computer, the user may enter data in a particular set of fields, in one field sequence. However, when the user is accessing the same form from a mobile device (such as a smartphone), the user may enter data in another set of fields or in a second field sequence. Thus, the type of device can be considered as relevant information.

The relevant information can also include the status of the present form. This is indicated by block 186. For instance, the relevant information may include what other fields have already been filled in on the present form. As an example, it may be that when a user is filling out a purchase order form the user may only need to enter either the email address or the street address. Therefore, if the e-mail address filed is already filled out, the field sequence may skip the street address field. However, if the e-mail address field is not filled out, then the field sequence may include the street address field. Thus, the status of the present form can be included as relevant information.

It will also be noted that other information can be considered relevant. This is indicated by block 188.

Once relevant information identifier 140 has identified the relevant information, metric calculation component 142 illustratively calculates a metric indicative of the chances that this user will navigate from the identified previous field (e.g., field 258) to the current field (e.g., field 264). This is indicated by block 190 in FIG. 3. The metric can be a variety of different types of metrics. For instance, metric calculation component 142 can calculate the probability that the user will navigate from field 258 to field 264, based upon the relevant information and the user's historical navigation sequence. The probability is indicated by block 192. Component 142 can also calculate the likelihood as indicated by block 194. Component 142 can calculate other metrics as well, and this is indicated by block 196.

Once component 142 has calculated the metric that indicates the chances that this given user will navigate from the previous field (e.g., field 258) on this form (e.g., form 252) to the current field (e.g., field 264), component 142 updates the metric for navigation to this field and also calculates and updates the metrics corresponding to other possible next fields on this form. For instance, referring again to FIG. 2, component 142 includes a field entry 146 for the previous field (e.g., field 258). Based on the fact that the user has navigated to the current field (e.g., field 264) from the previous field (e.g., field 258), component 142 updates all of the metrics corresponding to all of the other possible next fields on the form to account for the fact that the user has navigated from field 258 to field 264 on this form, under these conditions. Updating the metrics for the fields on the present form is indicated by block 198 in FIG. 3.

Identifier component 132 then identifies whether the user has continued navigate to another field on the present form (in either the forward or backward direction). This is indicated by block 200. If so, processing reverts back to block 170 where component 132 identifies the current field, etc. However, if, at block 200, it is determined that the user is no longer entering data on the present form, then navigation learning system 116 can illustratively output the information for use by other systems. This is indicated by block 202. For instance, system 116 may output the learned information to form designers 204 who can use the information to better design forms. It can also output the information to application developers 206, such as the developers that developed the current application 124. This can be used to modify the default field sequence, if enough users are using the same sequence. The information can be output to other systems as well. This is indicated by block 208.

Figure 4A:
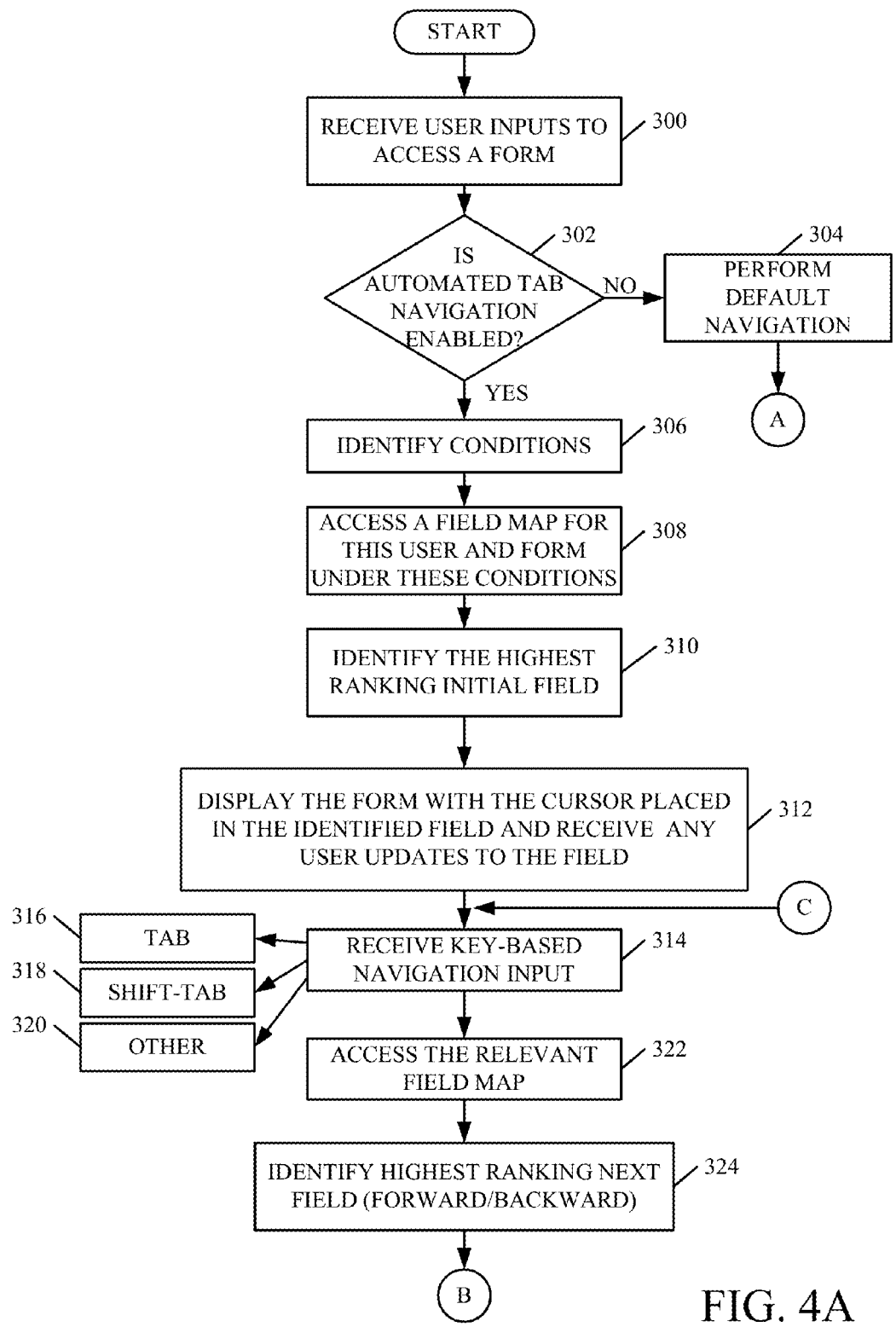
FIGS. 4A and 4B (collectively FIG. 4) show a more detailed flow diagram illustrating one embodiment of the operation of the system shown in FIG. 1 in performing automated key-based field navigation.
Figure 4B:
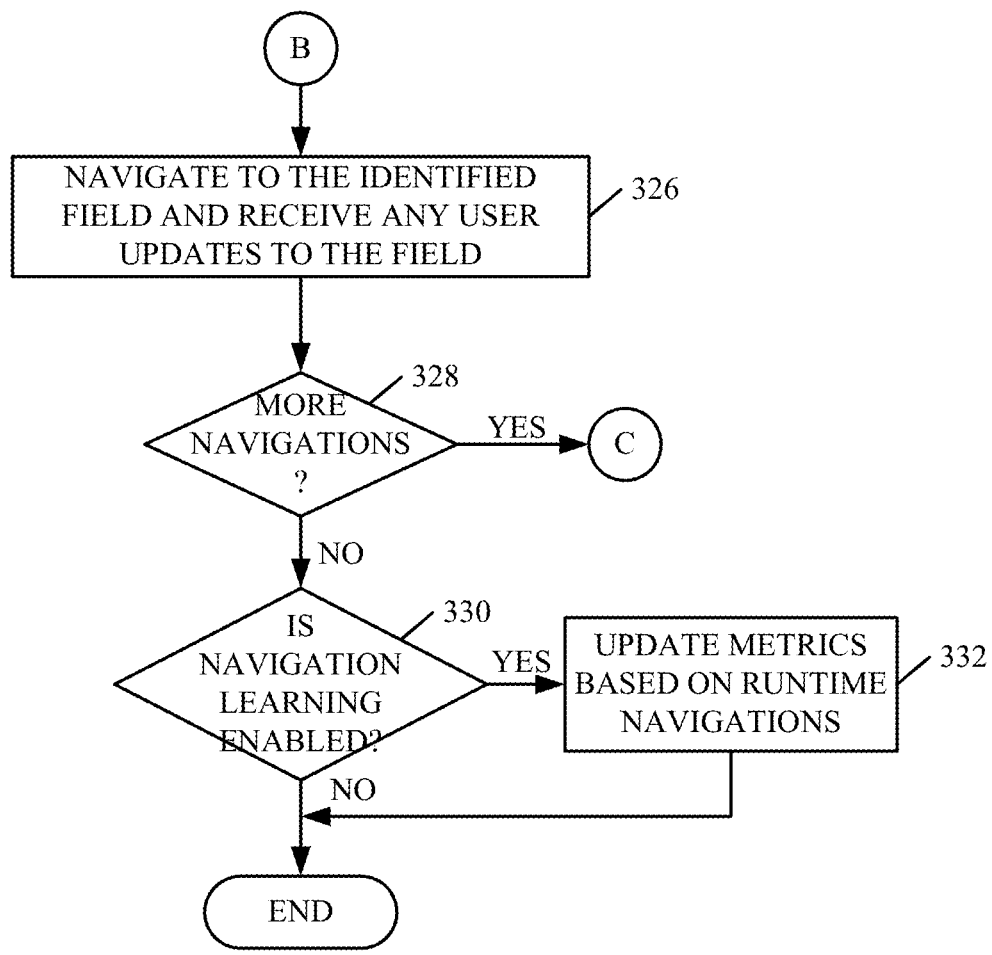

FIGS. 4A and 4B (collectively FIG. 4) show a more detailed flow diagram of one embodiment of the operation of form navigation component 114, during runtime. Form navigation component 114 first receives user inputs to access a form (such as form 252 shown in FIG. 1B). This is indicated by block 300 in the flow diagram of FIG. 4. Form navigation component 114 then determines whether the automated tab navigation is enabled. For instance, the user can enable or disable the automated navigation using buttons 280 and 282 on form 252. Determining whether the automated tab navigation is enabled or disabled is indicated by block 302. If it is disabled, then form navigation component 114 performs default navigation using the default field sequence for form 252. This is indicated by block 304.

However, if, at block 302, it is determined that the automated tab navigation is enabled, then form navigation component 114 identifies the conditions under which the present form has been accessed. This is indicated by block 306. For instance, component 114 can identify the various relevant information discussed above with respect to FIG. 3, to determine which particular field map 128 should be used for the automated tab navigation.

Component 114 then accesses a field map 128 for this user and this form, under the present conditions. This is indicated by block 308 in FIG. 4.

Recall that component 114 has just received inputs indicating that the user wishes to access a given form. Component 114 thus identifies the first field in the form where the cursor is to be placed, when the form is displayed. Component 114 can do this by identifying the highest ranking initial field on that form. This is indicated by block 310. By way of example, if the user is initially pulling up form 252, it may be that this user, under these conditions, normally enters data in the e-mail field 258 first. Thus, form navigation component 114 identifies the highest ranking initial field on form 252 as field 258.

Once this is done, component 114 displays the form with the cursor placed in the identified field. For instance, form 252 can be displayed with the cursor initially placed in e-mail field 258. The user can thus enter data into field 258. Displaying the form with the cursor placed in the initial field and receiving user updates to that field is indicated by block 312 in FIG. 4.

Navigation component 114 then receives a key-based navigation input indicating that the user wishes to switch to a different field. This is indicated by block 314. It can be a tab input 316, a shift-tab input 318 or another key-based input 320.

In response, form navigation component 114 accesses the relevant field map 128, as indicated by block 322, and identifies the highest ranking next field in the given direction, as indicated by block 324. By way of example, it may be that the highest ranking field to which the user normally navigates from e-mail field 258 is the phone number field 264. In that case, form navigation component 114 will navigate the user to the identified field (to phone number field 264) and place the cursor there so that the user can enter data in that field. The application that generates form 252 will receive the updates to field 264. Navigating to field 264 and receiving information is indicated by block 326.

As the user performs more key-based navigation steps with respect to form 252, this process continues. This is indicated by block 328 in the flow diagram of FIG. 4.

It should also be noted that, in one embodiment, the tab navigation learning system 116 can be running along with the runtime form navigation component 114. Therefore, as the user is using the given form 252, the navigation learning system 116 can be adjusting the metrics calculated for the various fields on form 252 to account for the user's current, runtime actions with respect to form 252. This is indicated by blocks 330 and 332 in the flow diagram of FIG. 4.

It can thus be seen that navigation learning system 116 can learn a user's behavior with respect to tab navigation on a particular form and dynamically change the behavior of the tab-based navigation to account for the user's behavior. The information can be learned for both navigation in the forward direction and in the reverse direction, and learning can be done separately, during a learning process, or during runtime, or both. It can also be seen that the user can easily disable both the learning and the automated navigation process.

In addition, either component 114, or system 116, or both, illustratively provide user input mechanisms so that user 104 can clear out all of the learned patterns, and start over. This may be helpful, for instance, when the user changes roles, when the organization employing the user changes policies with respect to what types of information are needed on various forms, or in other scenarios as well. In such cases, the user can quickly clear the learned tab navigation sequence so that the system can re-learn the new sequences for the various forms.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
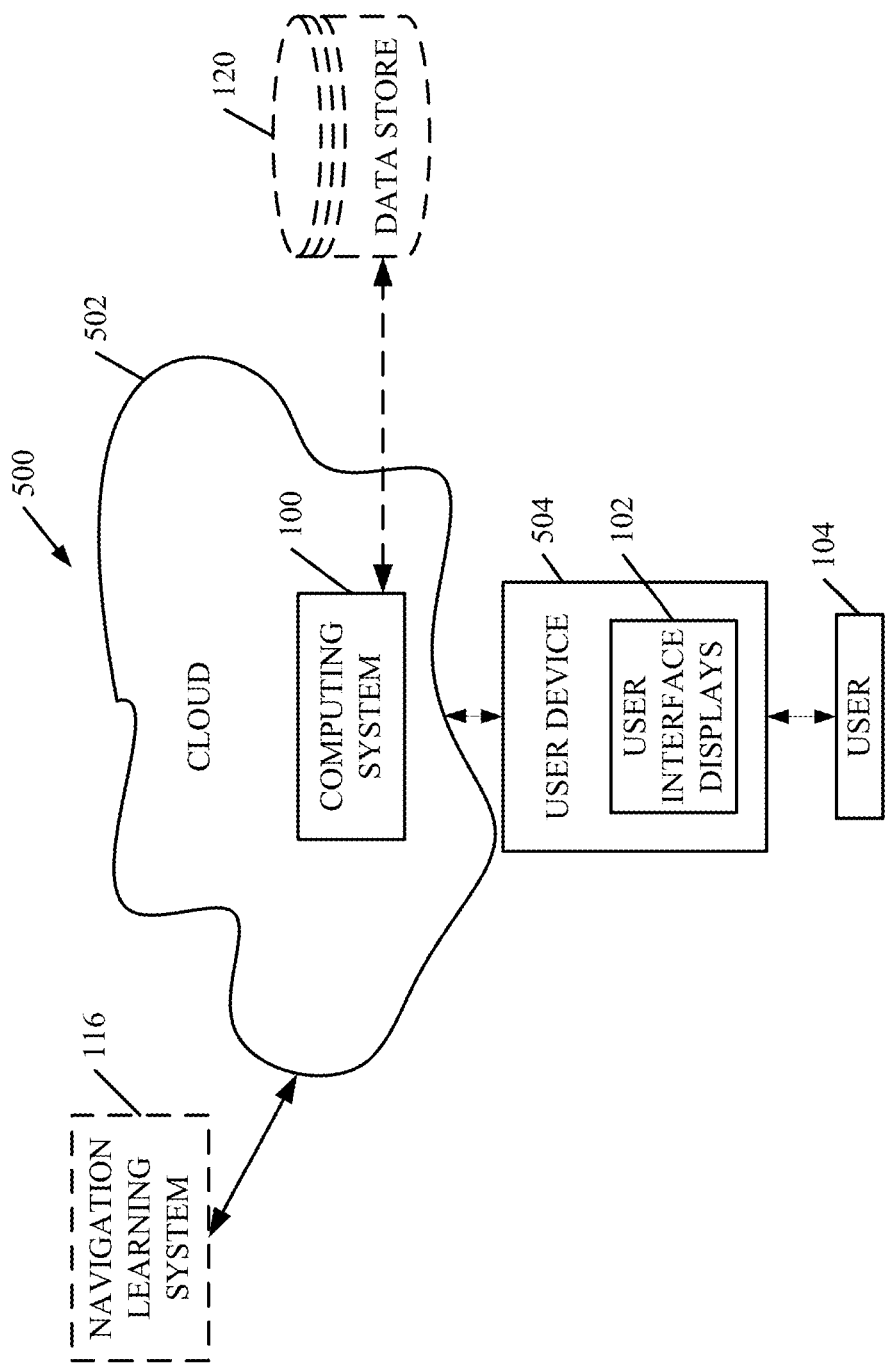
FIG. 5 shows one embodiment of the system illustrated in FIG. 1, deployed in a cloud computing architecture.

FIG. 5 is a block diagram of system 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that computing system 100 can be located in cloud 502 (which can be public, private, or a combination where portions are public while others are private). Therefore, user 104 can use a user device 504 to access those systems through cloud 502.

FIG. 5 also depicts another embodiment of a cloud architecture. FIG. 5 shows that it is also contemplated that some elements of system 100 can be disposed in cloud 502 while others are not. By way of example, data store 120 can be disposed outside of cloud 502, and accessed through cloud 502. In another embodiment, navigation learning system 116 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
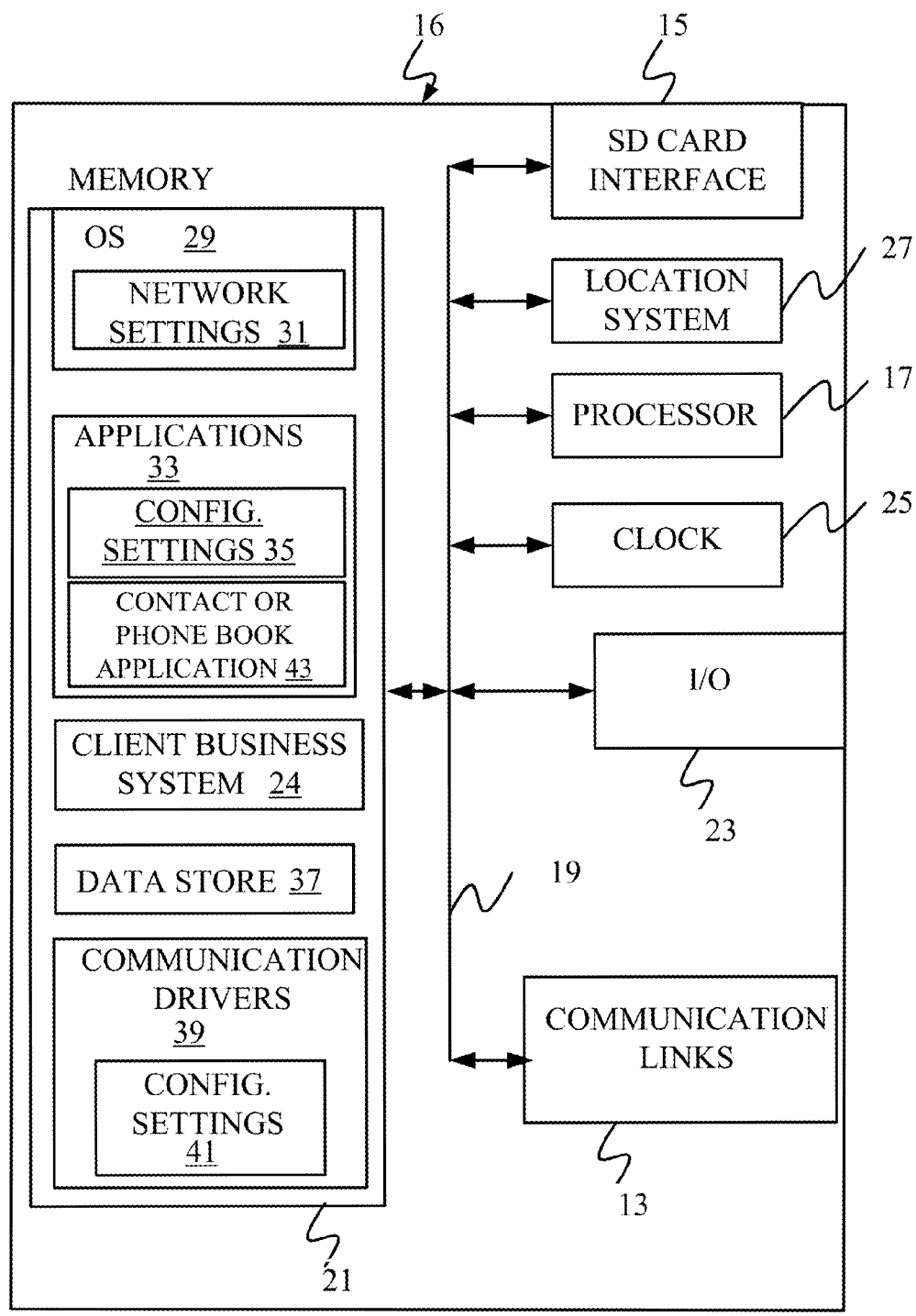
FIGS. 6-10 show various embodiments of mobile devices.

FIG. 6 is a simplified block diagram of one illustrative embodiment of a handheld or mobile computing device that can be used as a user's or client's hand held device 16, in which the present system (or parts of it) can be deployed. FIGS. 7-10 are examples of handheld or mobile devices.

FIG. 6 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 110 or 138 from FIGS. 1 and 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
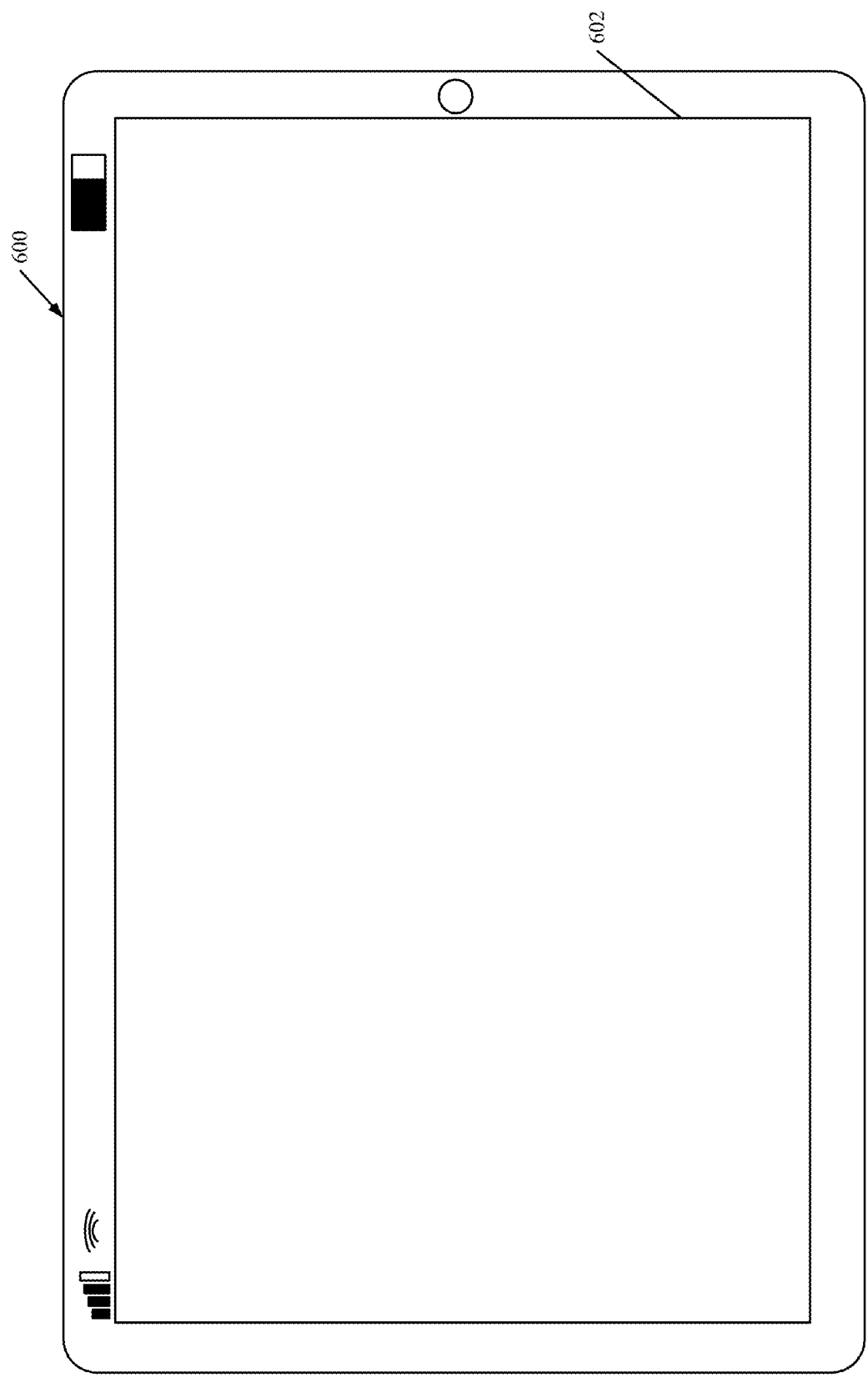

FIG. 7 shows one embodiment in which device 16 is a tablet computer 600. In FIG. 7, computer 600 is shown with user display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
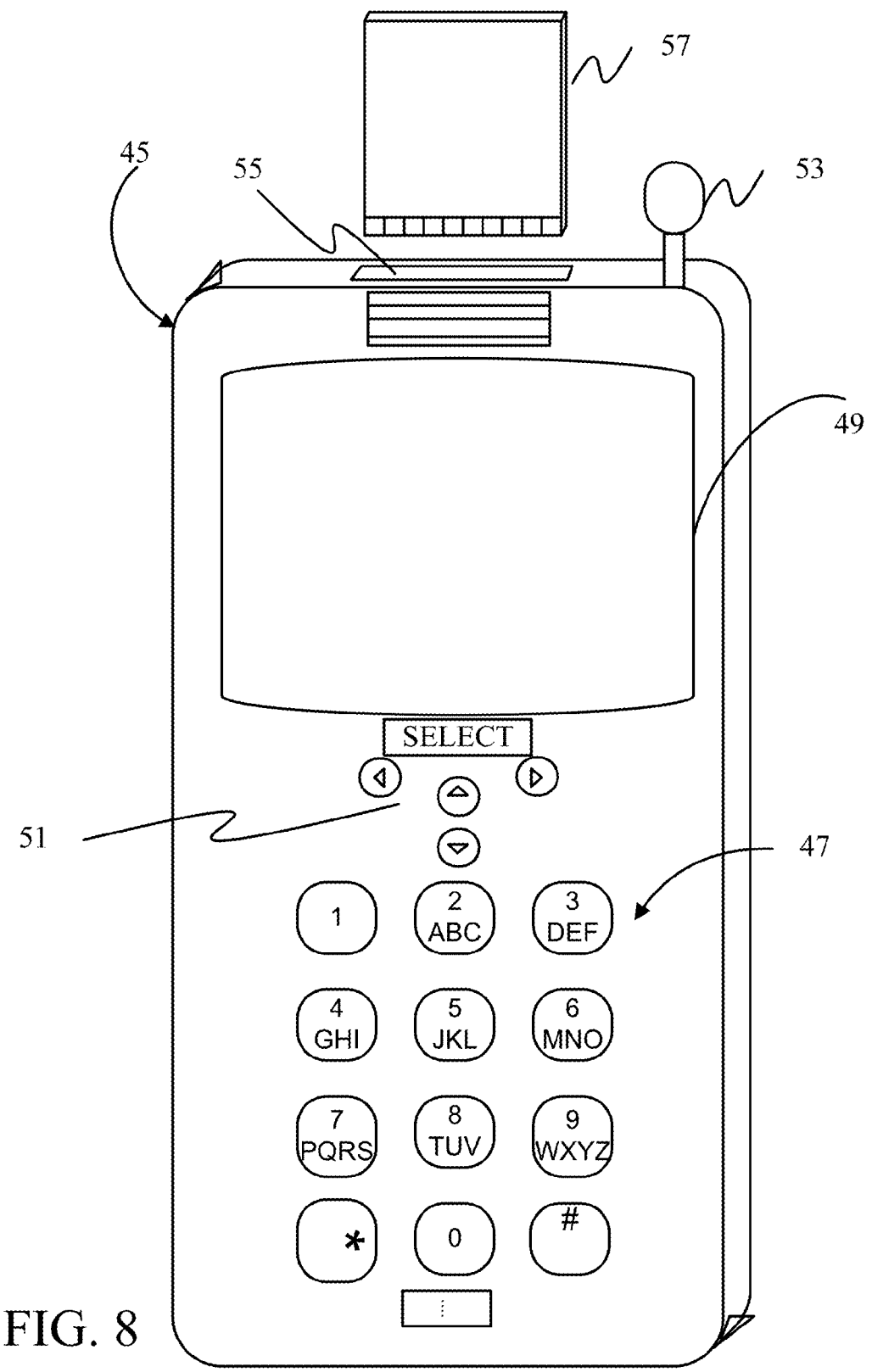
Figure 9:
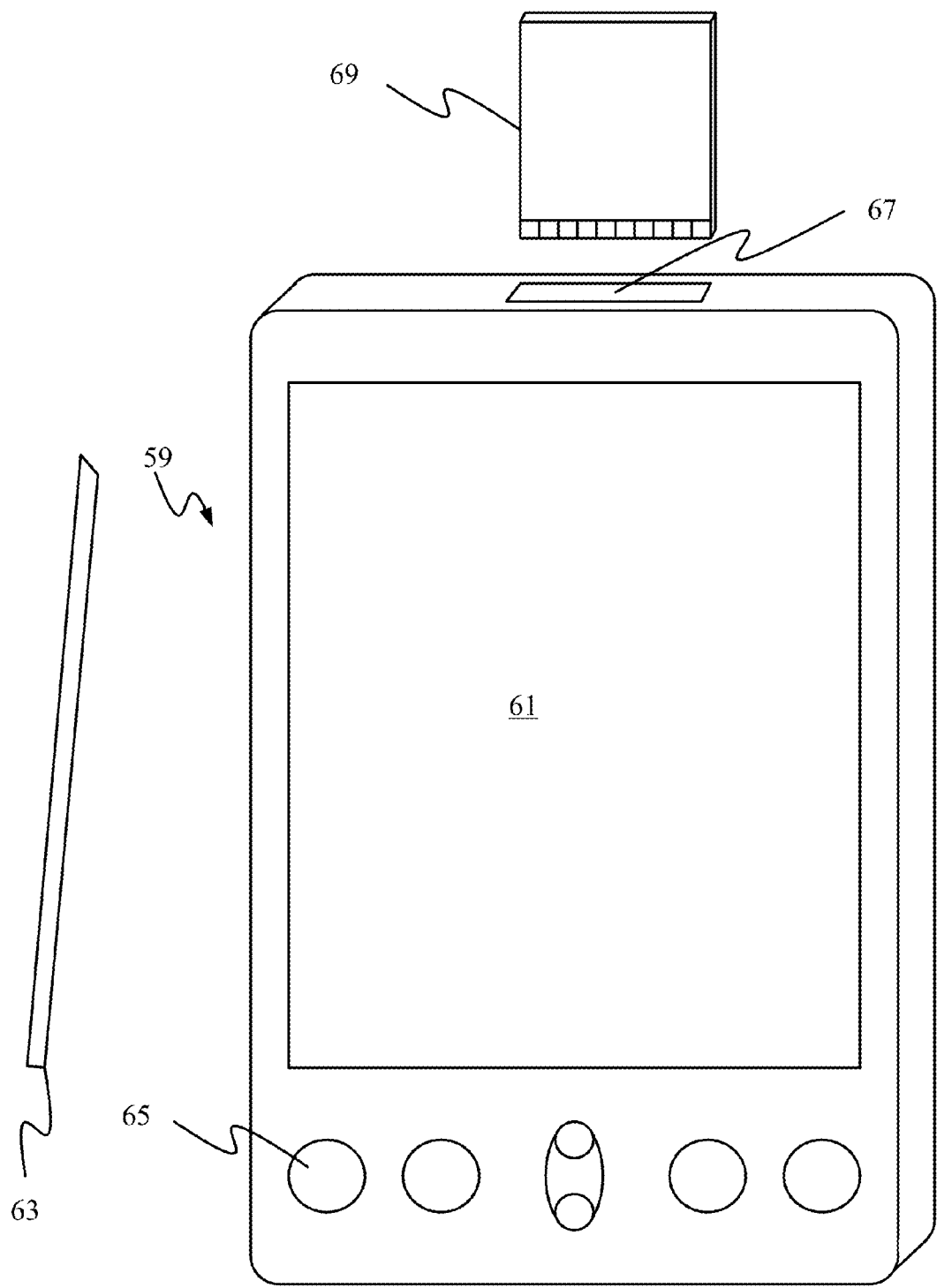

FIGS. 8 and 9 provide additional examples of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
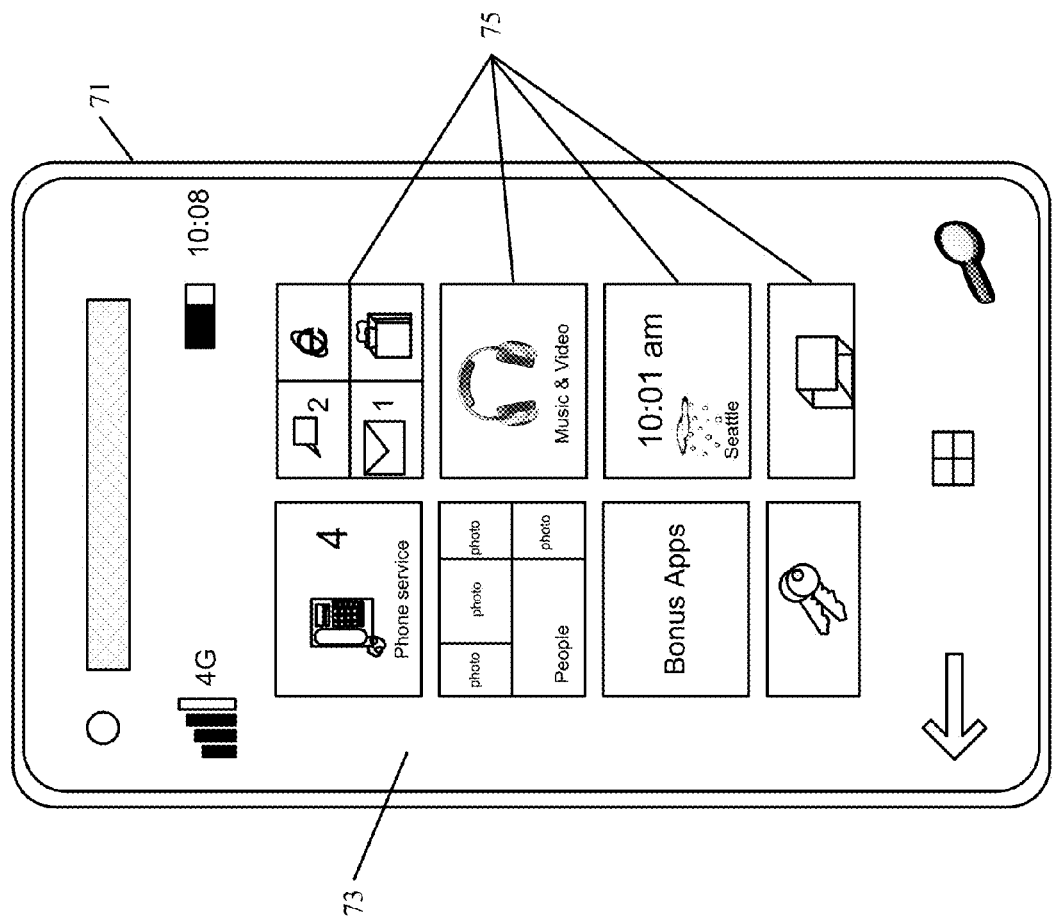

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
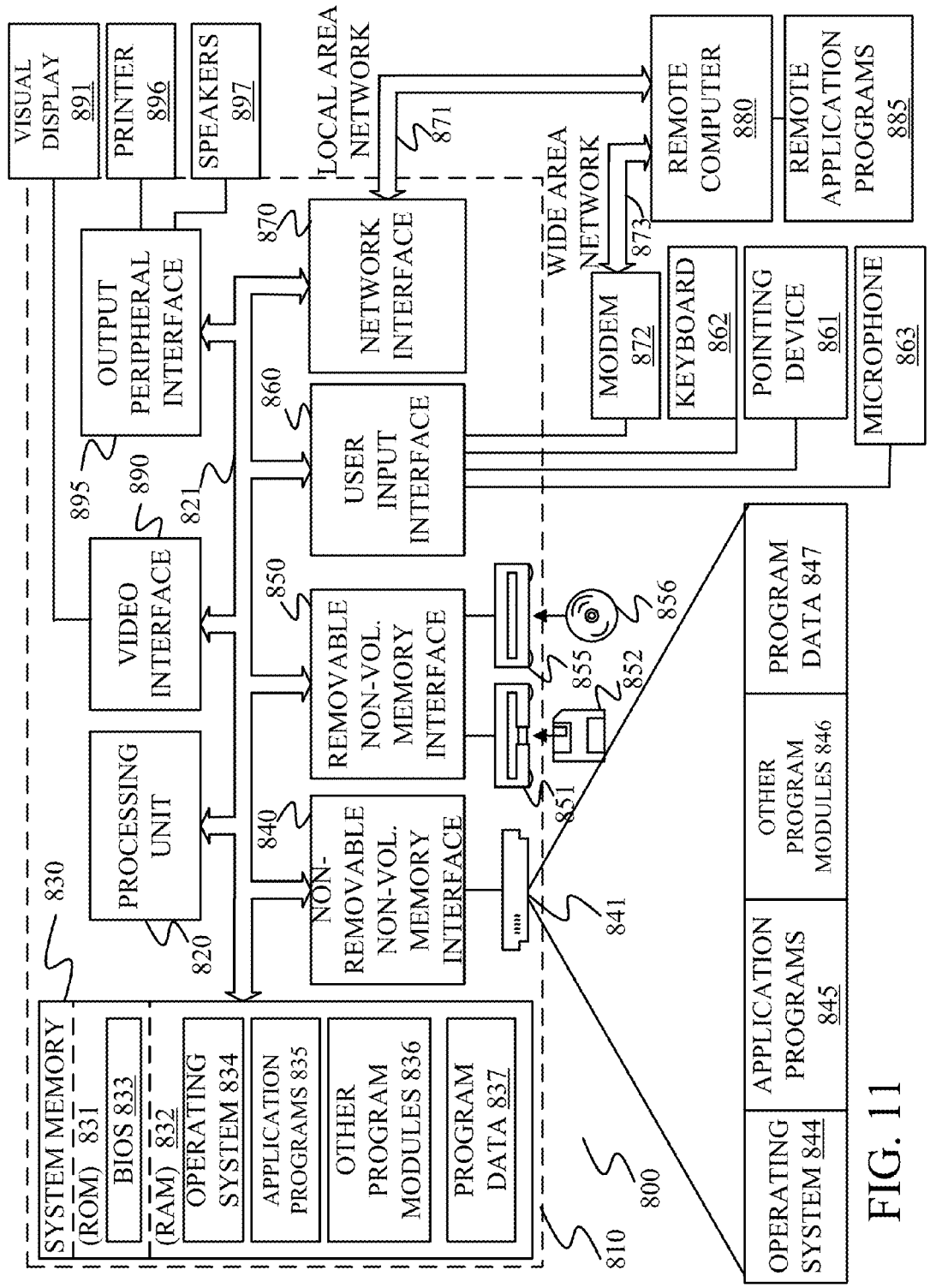
FIG. 11 shows a block diagram of one illustrative computing environment.

FIG. 11 is one embodiment of a computing environment in which system 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 110 or 138), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and 2 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    generating a representation of a form user interface display that displays a form with a plurality of data entry fields;
    identifying a first data entry field that has a current focus on the form;
    receiving an indication of a first navigation user input to navigate from the first data entry field to a second data entry field, the first navigation user input comprising a key-based navigation user input;
    identifying a field map that is associated with the first data entry field and includes a ranked list of possible next data entry fields, wherein the ranked list is ranked based on corresponding metrics that indicate a likelihood that the user will navigate from the first data entry field to each of the possible next data entry fields to enter data in a data entry sequence, wherein the corresponding metrics are based on historical field sequence navigation data from a plurality of previous user iterations through the form;
    based on the field map, selecting the second data entry field from the ranked list of possible next data entry fields;
    based on the indication of the first navigation user input, automatically navigating to the selected second data entry field by modifying the representation of the form user interface display to change the current focus on the form;
    based on an indication of a second navigation user input, automatically navigating from the second data entry field to a third data entry field by modifying the representation of the form user interface display to change the current focus on the form;
    in response to an indication of a user input that updates the third data entry field, generating updated metrics that are based on the historical field sequence navigation data and indicate an increased likelihood of the third data entry field as a possible next data entry field to follow the first data entry field in the data entry sequence; and
    based on the updated metrics, modifying the field map associated with the first data entry field to update the ranked list to reflect the increased likelihood of the third data entry field as a possible next data entry field to follow the first data entry field in the data entry sequence.

2. The computer-implemented method of claim 1 wherein modifying the representation of the form user interface display to change the current focus on the form comprises:
    modifying the representation of the form user interface display to move a cursor on the form.

3. The computer-implemented method of claim 1 wherein-selecting the second data entry field comprises:
    selecting a highest ranked data entry field in the ranked list of possible next data entry fields.

4. The computer-implemented method of claim 1, and further comprising selecting the field map from a plurality of field maps associated with the first field.

5. The computer-implemented method of claim 4, wherein the field map is selected based on at least one of:

context information indicative of a use input that navigates the user o the form;
a current status of the form; or
a type of device being used to access the form.

6. The computer-implemented method of claim 1, wherein the corresponding metrics indicate a relative frequency with which a user navigated to each of the plurality of next data entry fields during the plurality of previous user iterations.

7. The computer-implemented method of claim 1, wherein the field map comprises a plurality of field entries, each field entry corresponding to one of the plurality of data entry fields on the form and including a ranked list of possible next data entry fields, ranked based on corresponding metrics, for the corresponding data entry field.

8. A computing system comprising:
a processor; and
memory storing instructions executable by the processor, wherein the instructions configure the computing system to:
generate a representation of a form user interface display that includes a form with a plurality of data entry fields, comprising at least a first data entry field and a second data entry field;
determine that the second data entry field has a current focus on the form;
receive an indication of a user input that modifies the second data entry field;
in response to the modification of the second data entry field;
determine that the first data entry field was updated prior to the modification to the second data entry field;
identify a field map that is associated with the first data entry field and includes a ranked list of possible next data entry fields, wherein the ranked list is ranked based on corresponding metrics that indicate a likelihood that the user will navigate from the first data entry field to each of the possible next data entry fields to enter data in a data entry sequence, wherein the corresponding metrics are based on historical field sequence navigation data from a plurality of previous user iterations through the form;
generate updated metrics that are based on the historical field sequence navigation data and indicate an increased likelihood of the second data entry field as a possible next data entry field to follow the first data entry field in the data entry sequence; and
based on the updated metrics, automatically modify the field map associated with the first data entry field to reflect the increased likelihood of the second data entry field as a possible next data entry field to follow the first data entry field in the data entry sequence.

9. The computing system of claim 8, wherein automatically modifying the field map comprises adding the second data entry field to the ranked list.

10. The computing system of claim 9 wherein the instructions configure the computing system to:
access the modified field map associated with the first data entry field; and
automatically navigate through the data entry sequence based on an indication of a key-based navigation user input on the form.

11. The computing system of claim 10 wherein the instructions configure the computing system to:
automatically move a user interface element to the second data entry field based on the key-based navigation user input and the updated ranked list.

12. The computing system of claim 8 wherein the instructions configure the computing system to:
calculate a field sequence metric for each of the possible next data entry fields based on a relative frequency with which the user navigates to each of the possible next data entry fields, from the first data entry field; and
store the calculated field sequence metrics in association with the data entry sequence.

13. The computing system of claim 12 wherein the instructions configure the computing system to:
generate a data sequence entry for each respective data field entry of the plurality of data entry fields, the data sequence entry including a metric calculated for each possible next data entry field from the respective data field entry.

14. The computing system of claim 12 wherein the instructions configure the computing system to:
identify a plurality of different sets of context information; and
generate a plurality of field maps associated with the first data entry field, each field map corresponding to a different one of the plurality of sets of context information.

15. The computing system of claim 12 wherein the instructions configure the computing system to:
identify a current context associated with the user access of the form;
identify a field map based on the current context; and
access a field sequence metric from the identified field map.

16. The computing system of claim 8, wherein determining that the first data entry field was updated prior to the modification to the second data entry field comprises determining that the computing system navigated to the second data entry field from the first data entry field.

* * * * *